Patented Mar. 5, 1935

1,993,287

UNITED STATES PATENT OFFICE 1,993,287

PROCESS FOR PRODUCTION OF THIO-ETHERS FROM MERCAPTANS

William Seaman, Glens Falls, N. Y., assignor to Standard Oil Development Company, a corporation of Delaware No Drawing. Application December 29, 1931, Serial No. 583,787

7 Claims. (Cl. 260—151)

This invention relates to a new and improved process for the conversion of mercaptans to thio-ethers. This reaction has been described by Sabatier who stated that it was catalyzed by powdered cadmium sulphide.

While many of the more active catalysts for this reaction, when used to promote the reaction of substantially pure mercaptans at ordinary pressure, cause excessive losses due to fixed gas formation and undesirable side reactions, I have found means whereby even the most active catalysts may be used to advantage for production of maximum yields of thio-ethers. These means will be described below.

My improved process may be used for the conversion of alkyl mercaptans such as methyl, ethyl, propyl, butyl, amyl, and higher mercaptans and aryl mercaptans such as phenyl and the like. The process may be used with single pure mercaptans with the formation chiefly of the corresponding thio-ethers, or mixtures of mercaptans may be used and both symmetrical and mixed thio-ethers are then produced. I have found my process particularly suitable for use in converting the mixtures of mercaptans derived from petroleum. These mercaptans may be suitably recovered from petroleum by any known means such as by treating light cracked naphthas with aqueous alkaline solutions and subsequently distilling the spent solution with steam. While such mixtures of mercaptans as secured from petroleum may be passed directly over the catalyst, improved results are generally secured if the mixture is divided into fractions with a boiling range corresponding to only one or two mercaptans. For example, a fraction boiling below 50° C., and consisting substantially of methyl and ethyl mercaptans, is preferably treated at somewhat higher temperatures than the fraction boiling between 50 and 75° C., or above 75° C.

Improved catalysts for the production of thio-ethers are described in the co-pending application Serial No. 585,156 filed January 6, 1932 by Seaman and Huffman.

I have found that the mercaptan conversion to thio-ethers does not go to completion and that an appreciable amount of mercaptan is present under equilibrium conditions. Furthermore the equilibrium is reached only very slowly and it is accordingly not desirable to attempt to secure a maximum conversion in one pass through the reactor. I therefore prefer to operate with a reasonably low time of contact so as to secure about 50 to 65% conversion to thio-ethers per pass and to recycle the unconverted mercaptans over the catalyst. Some gas loss appears unavoidable but this loss may be greatly diminished and the ultimate yield of thio-ethers increased by conducting the reaction at pressures above atmospheric.

Pressures above atmospheric are also advantageous in that the loss due to side reactions is diminished. For example, the conversion of mercaptans to olefines and hydrogen sulfide, which results in an increases volume of product, is retarded by the use of increased pressures.

Suitably increased pressures for this reaction range from about 5 to about 50 atmospheres, for example, although higher and lower pressures may also be used. The reaction may be conducted at temperatures as low as 150 to 210° C. with low melting catalysts such as phosphorous pentasulphide or molybdenum sulfide, and at low space velocities of 0.5 to 0.05 grams of mercaptan per cc. of catalyst per hour. Temperatures of about 300 to 500° C. are preferred with catalysts such as cadmium and zinc sulfides, with space velocities of 2 to 25 or even higher, depending upon the temperature and the activity of the catalyst.

The reaction is preferably conducted in vapor phase, and the maximum pressure which may be used therefore depends upon the reaction temperature and the boiling range and partial pressure of the mercaptans used.

My invention is not to be limited to any specific disclosure given above merely by way of example, nor to the use of any specific catalysts, nor to the mechanisms of the reactions, but only by the following claims in which I wish to claim all novelty as far as the prior art permits.

I claim:

1. Process for the conversion of mercaptan to thio-ether comprising passing the mercaptan in vapor phase over a catalyst at a reaction temperature between 300° C. and 500° C. and a pressure substantially above atmospheric, and withdrawing a product comprising a thio-ether.

2. Process according to claim 1, in which the mercaptan contains not more than six carbon atoms.

3. Process according to claim 1, in which the mercaptan is an alkyl mercaptan of not more than five carbon atoms.

4. Process for the conversion of mercaptan to thio-ether comprising passing the mercaptan in vapor form over a catalyst at a reaction temperature between 300° C. and 500° C. and a pressure in excess of 5 atmospheres, and withdrawing a product comprising a thio-ether.

5. Process for the conversion of mercaptan to thio-ether comprising passing the mercaptan in vapor form over a catalyst at a reaction temperature between 300° C. and 500° C. and a pressure between the approximate limits of 5 and 50 atmospheres, and withdrawing a product comprising a thio-ether.

6. Process for the conversion of mercaptan to thio-ether comprising passing the mercaptan in vapor form over a catalyst at a reaction temperature between 300° C. and about 500° C. and a pressure in excess of 5 atmospheres, and withdrawing a product comprising a thio-ether.

7. Process for the conversion of mercaptan to thio-ether comprising passing the mercaptan in vapor form over a catalyst at a reaction temperature between 300° C. and about 500° C. and a pressure between the approximate limits of 5 and 50 atmospheres, and withdrawing a product comprising a thio-ether.

WILLIAM SEAMAN.